June 17, 1969  KAZUO MURATA  3,450,650
METHOD OF MAKING POROUS BODIES
Filed May 28, 1964
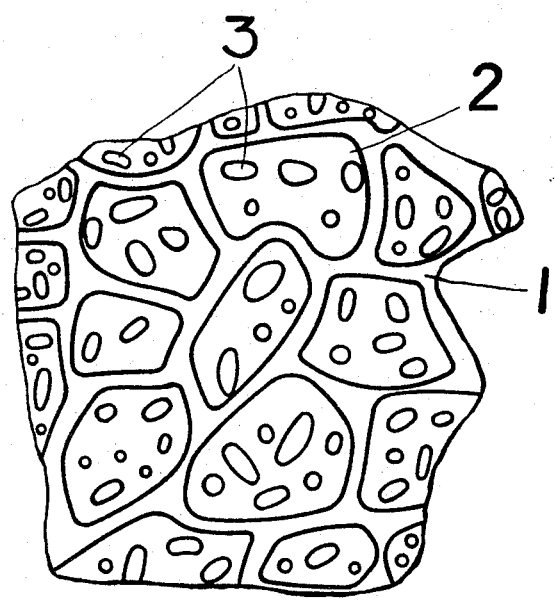
INVENTOR
Kazuo Murata
BY Watson, Cole, Grindle & Watson
ATTORNEYS

United States Patent Office 3,450,650
Patented June 17, 1969

3,450,650
METHOD OF MAKING POROUS BODIES
Kazuo Murata, Takatsuki, Japan, assignor to Yuasa Battery Company Limited, Takatsuki, Japan, a corporation of Japan
Filed May 28, 1964, Ser. No. 370,877
Claims priority, application Japan, June 13, 1963, 38/31,638
Int. Cl. C08f *47/08;* C08j *1/26*
U.S. Cl. 260—2.5    10 Claims

ABSTRACT OF THE DISCLOSURE

This application is concerned with a method of making a porous body by preparing a substantially uniform mixed liquid consisting of an organic high polymer, a first volatile solvent in which the organic high polymer is soluble and a second volatile solvent in which the organic high polymer is substantially insoluble but miscible with the first volatile solvent. The mixed liquid is formed into a thin film and then the solvents are evaporated at a temperature such that no foaming occurs due to expansion of the solvents in the mixed liquid, whereby a porous body having pores of very small diameter is obtained without use of pore-forming or foaming agents.

---

This invention relates to a method of making a porous body by removing a volatile liquid from a mixture of organic high polymer and volatile liquids of more than two kinds and to the products made thereby.

The methods heretofore known for making a porous body consist in coagulating latex or emulsion of rubber or synthetic resin without removing its water content; or extracting a soluble pore-forming powder from a mixture after the base material has been mixed with the pore-forming powder and molded; or sintering fine powder of synthetic resin; or expanding the gas absorbed into a base material; or heating a base material with the addition of a gas-forming agent. Operation of these methods not only needs large-scale production facilities but by any of the methods neither a porous body having uniform and very fine pores nor a very thin porous sheet can be obtained. On the other hand a different method is available for making a leather-like sheet having minute pores through a two step process, in the first of which a polyamide or polyacrylonitrile dissolved in a solvent containing a metallic salt is applied to cloth and in the second of which efflux of salt is effected through coagulation of polymer by immersing said cloth in a liquid miscible with the foregoing solvent and metallic salt. But it is hard to produce a thin and uniform porous sheet because viscosity of the solution is too high under this method, and a special coagulation bath is required.

This invention has for its object provision for a method of making a porous body and the product thereby made, the method being entirely new, free from all the foregoing defects and having many advantages that will become apparent in the course of the following detailed description. More particularly, it relates to a method of producing a porous body which comprises preparing a practically uniform mixture D consisting chiefly of organic high polymer A and a volatile solvent B capable of dissolving A and a volatile solvent C substantially incapable of dissolving said organic high polymer A but miscible with the solvent B and allowing the mixture D to stand in thin layers and volatilizing the volatile solvents B and C. Organic high polymer of more than two kinds may be used in this case. The volatile solvent B capable of dissolving high polymer and the volatile solvent C incapable of dissolving the high polymer but miscible with the solvent B may be respectively a mixture of more than two kinds of organic solvent.

Furthermore, under the invention, various soluble and/or insoluble substances may be for various purposes mixed with the mixture D, a liquid consisting chiefly of high polymer and a solvent of more than two kinds. A plasticizer is added chiefly for dual purposes. One purpose is to change properties of polymer and facilitate forming of pores. For example, in the case where polystyrene is used for obtaining mutually communicating pores, a very satisfactory result is obtained from the addition of a plasticiser, for otherwise independent pores usually are formed. Another purpose is to increase flexibility of a porous body and resistance to friction and bending, hence the scope of its application may be enlarged to the purposes of glossing and improvement of sense of touch. A soluble surface active agent may be added, which can change the formation of pores, and normally make pores very small and uniform, improving water absorption of a porous body. Still further, viscosity modifiers and dye-stuffs may be added. Insoluble materials include pigment, diatomite, fine powder of siliceous material and fibrous materials insoluble or hard to be dissolved in the mixed liquid. Fine powder of synthetic resin may also be added.

One of the primary applications for the methods of this invention is to apply the foregoing mixture to materials such as paper, woven and knitted cloth, non-woven fabrics, various sponges, etc. Thus the use of such porous base materials not only ameliorates mechanical strength of a porous body but prevents shrinkage of texture and increases volatility of solvents, hence contributing toward improvement of porous body.

The porous body provided by this invention is normally of very fine structure invisible by microscope. The formation mechanism of the porous body is complicated and is beyond plain description but the primary mechanism is presumed to be as follows:

First, when high polymer A is immersed in B, a uniform high polymer solution is obtained. To the solution is added a volatile solvent C hard to dissolve said high polymer A but miscible with the solvent B; as B and C are miscible, C is dispersed into solution dissolving polymer A to make well-mixed solution D. Presumably, a difference in the nature of the high polymer A and the kind and constituent ratio of the solvents B and C may in this step of process cause the fractional molecules of the high polymer A and the solvents B and C to aggregate singly or by a gradual combination of other molecules in said mixed solution D. Further addition of a large amount of the solvent C hard to dissolve high polymer makes the mixture D cloudy and the high polymer begins to coagulate. The clouding point of the mixture varies depending upon the high polymer A and the kind and ratio of the solvents B and C and temperatures, the mixture D in the case of this invention being preferably a homogeneous one of sufficient fluidity to be practically clear or cloudy. The mixture D that is very cloudy or viscous or coagulated or gelatinized is unsuitable for making a thin film. In preparing the mixture, high polymer A may be dissolved in a mixture of the solvents B and C instead of following the foregoing order of steps. Much the same result may be obtained through this step, although the velocity of dissolution changes. In the next step a porous body is formed to dry as either a thin film which is formed by pouring the mixed liquid over a plate or a sheet obtained from dipping a base material consisting of a thin micro porous sheet in mixed liquid. In this step both B and C dissolving the high polymer A are volatilized from the surface of the film or the sheet, and the mixed liquid D is gelatinized and coagulated. In order to form minute pores plenty of C constituents must be retained in the drying stage of the process, and for this purpose a ratio of the starting B constituent to the starting C constituent in the mixed liquid and a difference in volatility degree between B and C in the components must be taken into consideration. The difference in volatility degree is on the whole determined by a difference of boiling point. In many cases, selection is made of C having higher boiling point than that of B. But the difference of boiling point is not an absolute criterion.

There is in the coagulated texture a liquid phase consisting chiefly of C and that of high polymer A containing more or less of B or C and it is believed that one of the two phases is very finely divided and dispersed in the other phase. The appended drawing shows a texture state of one type illustrating the case in point, wherein the numeral 1 indicates a phase consisting chiefly of a solvent C and the numeral 2 represents high polymer A yet to be coagulated which contains a solvent B and in which remains a liquid portion 3 consisting chiefly of an isolated and separated solvent C. It is estimated that this kind of formation of texture consistutes the reason why the pores of the product provided by this invention are so small. When a liquid phase forms a continuous phase, pierced pores are formed after the solvent has been fully evaporated. When a liquid phase forms an independent dispersoid, a porous body having independent pores is formed. The aggregating power of high polymer and solvents, affinity of solvents and polymer, latent heat of vaporization or the like may be mentioned as factors viewed from a point of quality of materials in determining which type of porous body is formed. The molecular structure and weight, plasticizer, and surface active agent, etc. are effective modifiers of the foregoing factors. Furthermore, as outside factors may be mentioned partial pressure of solvent vapor in atmosphere, removal rate of solvent vapor, drying temperature, whether or not a base body is used and, if so the structure and thickness of the base body. Consequently, by changing the material used and the conditions under which production is carried out, a desired type of porous body is obtained. Here description of all the combinations of the above factors is impossible, but they are included in the scope of this invention.

When a mixed liquid is poured over a plate or a drum made of glass or metal to form a film, pores made over its volatilized surface become smaller in size than those over its other side facing the plate, and are sometimes so small that they may be substantially closed. Therefore, this characteristic may be used to obtain pores of different diameters on both surfaces of a film. This is because vaporization is effected from one side alone and coagulation of polymer on that side is brisk. When a porous base body is impregnated with mixed liquid, shrinkage is prevented and pierced pores are liable to be made. When a filler is added, uniform pierced pores tend to be formed. In the absence of the base body, expanding of the mixed liquid on plate is liable to prevent shrinkage and thereby pierced pores are obtained, and the larger the percentage of the solvent C contained in the mixed liquid, the greater the pore diameter and porosity, and the shrinkage due to volatilization.

No particular temperature higher than normal is usually necessary for drying. But in some cases vaporization may be effected in a room where a partial pressure of solvent vapor has been regulated to control the velocity of volatilization and change the state of a volatilized surface. Also it can be carried out at a particularly low or high temperature. In other cases the state of pores may be changed through the process of heat treatment at a high temperature after completion of drying at a normal temperature. However, this heating is not desirable when it involves a latent possibility of foaming by the expansion of the solvent remaining in the mixed liquid.

In still another case, after drying has been completed to such a degree as to gelatinize the surface of the mixed liquid, the sheet may be dipped in a liquid such as water or alcohol incapable of dissolving polymer but miscible with the solvent, particularly the solvent C, and thereafter the solvent may be removed. This process is particularly efficient when the volatility of the solvent C is poor. Immediately after the mixed liquid has been poured over the plate or applied over a base body, the plate or the base body may be dipped in the liquid mentioned above. But the product being very fragile in texture and hard to handle, this method is not preferable. When mechanism of formation and the trend of experiment as noted above are considered in the change of each factor, a porous body suitable for use may be produced.

For clearer understanding of the present invention, some examples embodying the same are given hereunder.

EXAMPLE 1

To a solution of 7 parts of polyvinyl chloride in 63 parts of tetrahydrofuran is gradually added 30 parts of ethyl alcohol under thorough stirring, to obtain a clear mixture. When the mixture is poured over a flat glass plate and dried at room temperature, a homogeneous porous body with a thickness of about 0.02 to 0.05 mm. and a pore diameter of less than a few micron is obtained. As the solvent B ketones such as methyl ethyl ketone may be used instead of tetrahydrofuran. Concentration of polymer may be preferably set at 3 to 25%. As the solvent C, a mixture of one to several kinds of lower aliphatic alcohols having a normal chain or a side chain, particularly, those consisting of about 1 to 10 carbon atoms is preferred, in a ratio of 5 to 70% of the solvent to polymer solution. The porous body thus produced can have a pore, say, with the smallest diameter of several handred angstroms. A thin porous body is easier to produce, but that of about 1 mm. in thickness may be obtained.

EXAMPLE 2

To a solution of 4.5 parts of polystyrene in 85.5 parts of chloroform is added 10 parts of n-butylalcohol and is further added 1 part of dibutyl phthalate under constant stirring to make a clear mixture. The mixture is subjected to the same step as Example 1, to yield a porous body of 0.02 to 0.05 mm. in thickness. When polystyrene is used as polymer, the use of the solvent B is not limited to the above alone, but tetrahydrofuran, carbon disulfide, chlorinated lower hydrocarbons such as carbon tetrachloride, ethylene chloride and such aromatic compounds as benzene and toluene are preferably used, in concentration of polymer of 3 to 20% depending upon degree of polymerization. Besides that, a mixture of one to several kinds of lower aliphatic alcohols may be used as the solvent C, in a suitable ratio of 15 to 35 wt. percent of the solvent to a polymer solution. In addition, the use of plasticizer such as dioctyl phthalate, etc. that is in general use is not objectionable in a suitable ratio of the plasticizer of about 5 to 50% to polymer. A porous body thus produced is provided with a pore diameter of several microns which is liable to become larger in pore mesh than in the case of polyvinyl chloride. In the absence of plasticizer, a porous body having independent micropores may be produced.

EXAMPLE 3

When a porous base body having a porosity of about 70 to 90%, a pore diameter of 0.05 to 1 mm. and a thickness of about 0.02 to 0.2 mm., such as woven or knitted cloth, paper made of synthetic or mineral fibers, nonwoven fabrics, is impregnated with the mixture described in Example 1 or 2 and dried, a homogeneous microporous body having much the same thickness as, or thicker by about 0.1 mm. than, that of the base body and a pore diameter of smaller than several microns is produced. When pierced pores are desired, a porous sheet like this is especially effective. Particularly in the case wherein polystyrene is used, the effect is great. When the size of the mesh of a porous body is small, a uniform microporous body is easily obtained, particularly when the base body is thick, this tendency becomes more pronounced.

The method of applying the mixed liquid continuously to a porous base body may be operated in such a manner that a porous sheet moving continuously is passed through a vessel containing the mixed liquid or the liquid is poured over the moving sheet, or a revolving roller or brush may be used in applying the liquid continuously to the sheet, and thereafter the treated sheet is passed through a heating apparatus or a quick drafting system for removing volatile matter to be sent to a take-up means or cut into a desired size of use. How much mixed liquid remains in the base body may be controlled by squeezing it out when the base body is raised from the mixture.

EXAMPLE 4

To the mixture described in Example 1 or 2 is added 2 to 10 wt. percent of diatomite under stirring. The mixture is either poured over a glass plate or applied to the base body as described in Example 3 and thereafter volatile matter is removed, to yield a microporous body with a thickness of about 0.05 to 2 mm., somewhat thicker but easy to have liquid permeated. As for an additive, dyestuffs, pigments, pulverized silica, pulp, lignin, carbon black, synthetic resin powder, etc. may be used for various purposes. Furthermore, when the additive is increased in quantity, it may be kneaded and molded. When it is small in quantity, the viscosity of the liquid may preferably be raised to make suspension easy.

In any one of the foregoing examples, there are cases wherein a recovering equipment is provided to collect a volatile matter in process of manufacturing and a fractionating equipment to fractionate collected liquid, if necessary. A small amount of water contained in the mixture is not objectionable. Any of nonionic, cationic and anionic types may be used as a surface active agent.

The method of this invention as described above and the porous body obtained thereby have many advantages as listed hereunder:

(1) Porous body provided by this invention is exceedingly small in pore diameter, having countless uniform micropores, which are used for various purposes, particularly, suitable for an electrolytic diaphragm through which ions can freely pass and which yet prevents microparticles from passing.

(2) The method of this invention dispenses with a pore-forming material or a foaming agent, hence the porous body prepared thereby can be as thin as desired.

(3) The porous body of this invention has high porosity and gas permeability. Unless a hydrophilic substance is employed, water does not permeate.

(4) The pore size can be simply controlled by changing the ratio of the solvent B to C in the mixture.

(5) The present method whereby mixing of liquids is employed in the production of a porous body is easier to put into practice than that by which gas-absorbing or gas-generating pulverized solids are mixed.

(6) Compared with the method by which a gas-generating solid or a pore-forming powder is added, the method of the present invention by which a completely uniform mixture is used can ensure better dispersion and consequently provide an even coated film when coated.

(7) Since the mixture of this invention consists of a volatile substance, it dries easily, hence production is sped up.

(8) The mixture can be easily applied to a porous base body such as woven cloth or non-woven fabrics and adherence between the two substances is excellent.

(9) The method of this invention requires no large-scale production facilities nor particular heating nor pressing, hence it is suitable for mass production at a low cost.

The present invention having many advantages as itemized above can be applied to every sphere of industrial activities, such as filter materials, electrolytic cells, diaphragms for primary batteries, storage batteries, and fuel cells, active material retainers of batteries, bandages, reagent absorbing paper, clothes, ornamental goods taking advantage of its ready printability and colorability, imitation leather, etc.

For example, it is applicable to batteries as follows:

To 70 parts of solution of tetrahydrofuran containing 10% of polyvinyl chloride is added 30 parts of ethyl alcohol, and is further added a small amount of a surface active agent, and mixed up. The mixture is applied to a porous sheet mated of synthetic fabrics with a thickness of 0.05 to 0.1 mm. and thereafter a volatile substance is volatilized, to yield a microporous sheet with a thickness of 0.06 to 0.15 mm. This sheet is used as a separator of various primary or secondary batteries, fuel cells, such as lead-acid batteries and nickel-cadmium batteries. Compared with the separators heretofore in use, such as microporous hard rubber sheet, sintered product of PVC powder, and treated wood, the separator obtained by this method has such a low electrical resistance of about one-tenth, being suitable especially for a thin plate such as one for batteries in which a plate with a thickness of 1 mm. or less is used. When the mixed liquid is prepared by reducing the amount of alcohol to be added to the foregoing mixture to 15 to 25 parts, and the mixed liquid thus foregoing base body, the plate or the base body will have a film with a thickness of 0.02 to a 0.07 mm. and a pore diameter of less than several hundred Angstroms, being used singly or jointly with a semi-permeable membrane such as cellophane as a separator of silver oxide-zinc battery or silver oxide-cadmium battery.

When the porous film having a thickness of about 0.02 to 0.15 mm. with or without the foregoing base body provided by this invention is dipped in an aqueous solution of polyvinyl alcohol, the pores of the film are filled up with polyvinyl alcohol. The film thus treated becomes permeable on account of the polyvinyl alcohol soaked in the film becoming gelatinized in an alkaline solution, hence the product thus obtained is very useful as a separator of alkaline battery, especially as that of silver oxide-zinc battery or silver oxide-cadmium battery. Thus the impregnation of the pores of a uniform porous body provided by this invention with other substances such as cellulose, semipermeable membrane, or the like, is one of other useful types of utilization.

This invention may also be applied to active material retainers of lead acid battery in which tube-type positive plate is used. The comparatively large meshes of cylindrical active material retainers having a pocket which consists of conventionally used inter-woven glass fiber reinforced with synthetic resin or knitted or woven glass fiber or synthetic fiber, for example, are sprayed with, or dipped in, the mixed liquid described in Example 1 or 2 of this invention for sticking, and thereafter a volatile substance is volatilized from the meshes of the active material retainers, to form micropores. In another case, a thin sheet of this invention with a thickness of about 0.05 to 0.15 mm. may be applied to the outer, inner or central part of the active material retainer. The shedding of active material from the retainer thus produced showed a drop of one-fiftieth in comparison with that from the retainers in conventional use. The present invention as described provides an entirely new method of manufacture and a porous body of excellent characteristics and properties. It is to be understood that the invention is not limited to the specific embodiment herein illustrated and described but that many modifications thereof falling within the scope of the invention could also be employed without departing from its spirit. Namely, polymer used in this invention is not limited to polyvinyl chloride and polystyrene, but polymer and copolymer of vinylidene, polymer and coplymer of acrylonitrile, polymers of methacrylic esters, polyamide, cellulosic derivatives, polyvinyl acetate, and other vinyl polymers, polyolefines, polycarbonate, some kinds of soluble epoxy resin and condensation product, various kinds of graft polymer and the like dissolving in solvent are used and a mixture of more than two kinds are also used. A choice is also allowed of a solvent, depending upon the kind of synthetic resin used. Besides those mentioned above, ketones such as acetone cyclohexanone, esters such as amyl acetate, aromatic alcohol, dioxane and other ethers, aliphatic hydrocarbon, turpentine, acids such as formic or acetic acid, phenolic acid, dimethyl formamide, and other comparatively low molecular organic compounds may be used.

What is claimed is:

1. A method of making a porous body comprising the steps of preparing a substantially uniform mixed liquid comprising an organic high polymer, a first volatile solvent capable of easily dissolving said organic high polymer and a second volatile solvent incapable of dissolving said organic high polymer but miscible with said first volatile solvent, forming said mixed liquid into a film, and then volatilizing the volatile solvents at a temperature such that no foaming occurs by expansion of the solvents in said mixed liquid.

2. A method of making a porous body as claimed in claim 1 wherein a plasticizer is added to the mixed liquid.

3. A method of making a porous body as claimed in claim 1 wherein a surface active agent is added to the mixed liquid.

4. A method of making a porous body as claimed in claim 1 wherein said step of forming said mixed liquid into a film comprises applying said mixed liquid onto a thin porous base material.

5. A method of producing a porous body as claimed in claim 1 wherein said step of forming said mixed liquid into a film comprises immersing a thin porous base material in said mixed liquid.

6. A method of making a porous body as claimed in claim 1 wherein said step of forming said mixed liquid into a film comprises pouring said mixed liquid onto a flat plate.

7. A method of making a porous body as claimed in claim 1 wherein said volatile solvents are partially volatilized and said method comprises the further steps of immersing the porous body in a liquid incapable of dissolving said inorganic high polymer but miscible with the volatile solvents in said mixed liquid thereby completing solidification of the organic high polymer and then drying said porous body at a low temperature whereby no foaming occurs by expansion of the solvent.

8. A method of making a porous body as claimed in claim 1 wherein said organic high polymer in said mixed liquid is taken from the group consisting of polyvinyl chloride and polystyrene, said first volatile solvent is taken from the group consisting of tetrahydrofuran, methyl ethyl ketone, chloroform, carbon disulfide, carbon tetrachloride, ethylene chloride, benzene and toluene and said second volatile solvent is at least one lower aliphatic alcohol consisting of 1–10 carbon atoms.

9. A method of making a porous body as claimed in claim 1 wherein 3–25 percent of said mixed liquid is organic high polymer.

10. A method of making a porous body as claimed in claim 1 wherein 5–70 percent of said mixed liquid is said second volatile solvent.

References Cited

UNITED STATES PATENTS

| | | | |
|---|---|---|---|
| 2,442,940 | 6/1948 | Staudinger et al. | 260—2.5 |
| 2,681,321 | 6/1954 | Stastny | 260—2.5 |
| 2,744,291 | 5/1956 | Stastny et al. | 260—2.5 |
| 3,018,257 | 1/1962 | Spencer | 260—2.5 |
| 3,085,073 | 4/1963 | Lintner et al. | 260—2.5 |

SAMUEL H. BLECH, *Primary Examiner.*

MORTON FOELAK, *Assistant Examiner.*

U.S. Cl. X.R.

106—122; 117—161; 204—296; 260—17.5, 30.4, 30.8, 31.8, 32.8, 33.4, 33.6, 33.8, 34.2, 41